Oct. 30, 1923.
O. C. THOMPSON
METHOD OF MAKING BOX PARTS OR BOXES
Filed Dec. 9, 1921     6 Sheets-Sheet 1
1,472,534
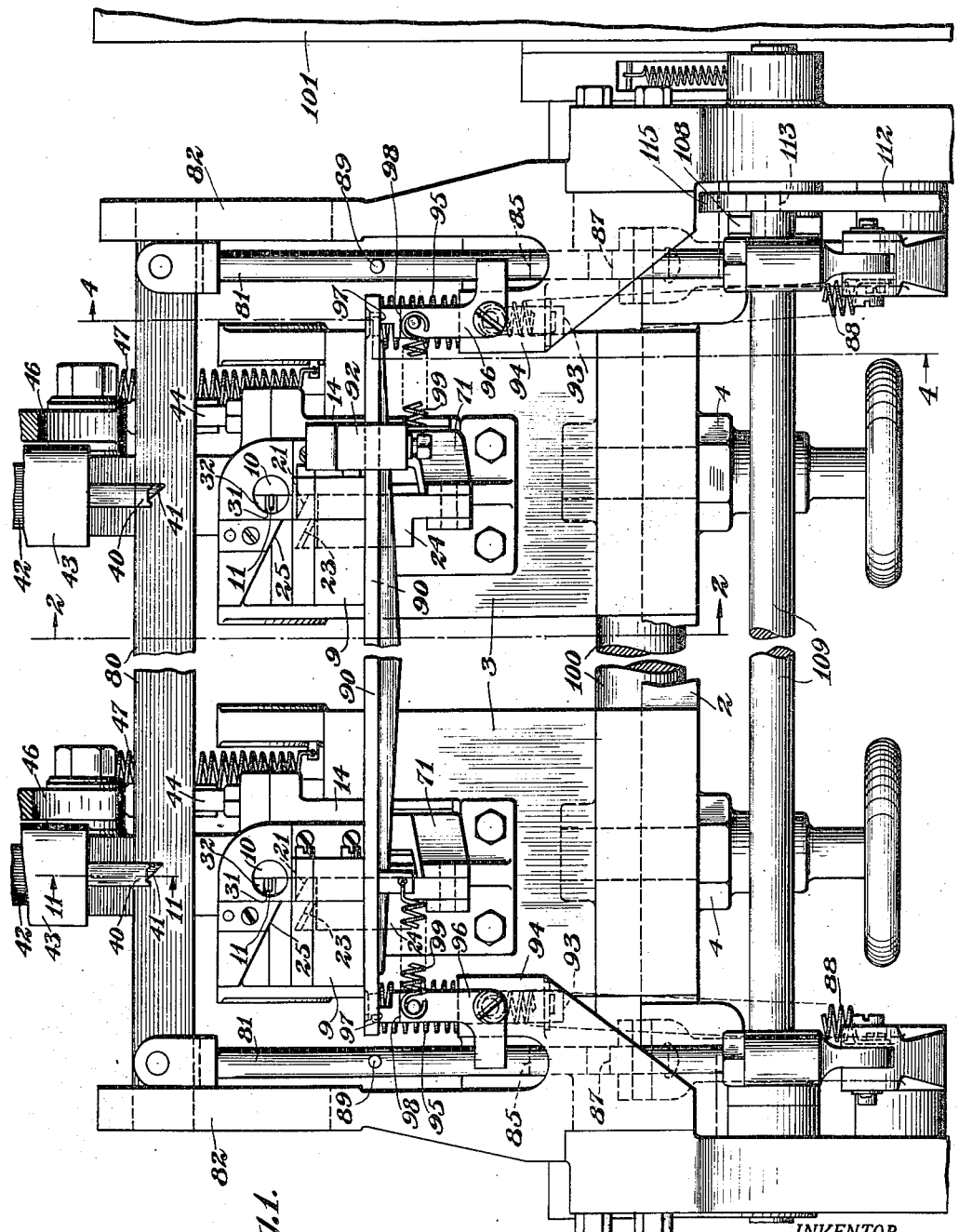
INVENTOR.
Osceola C. Thompson
BY Edward Dunne Jr.
ATTORNEY.

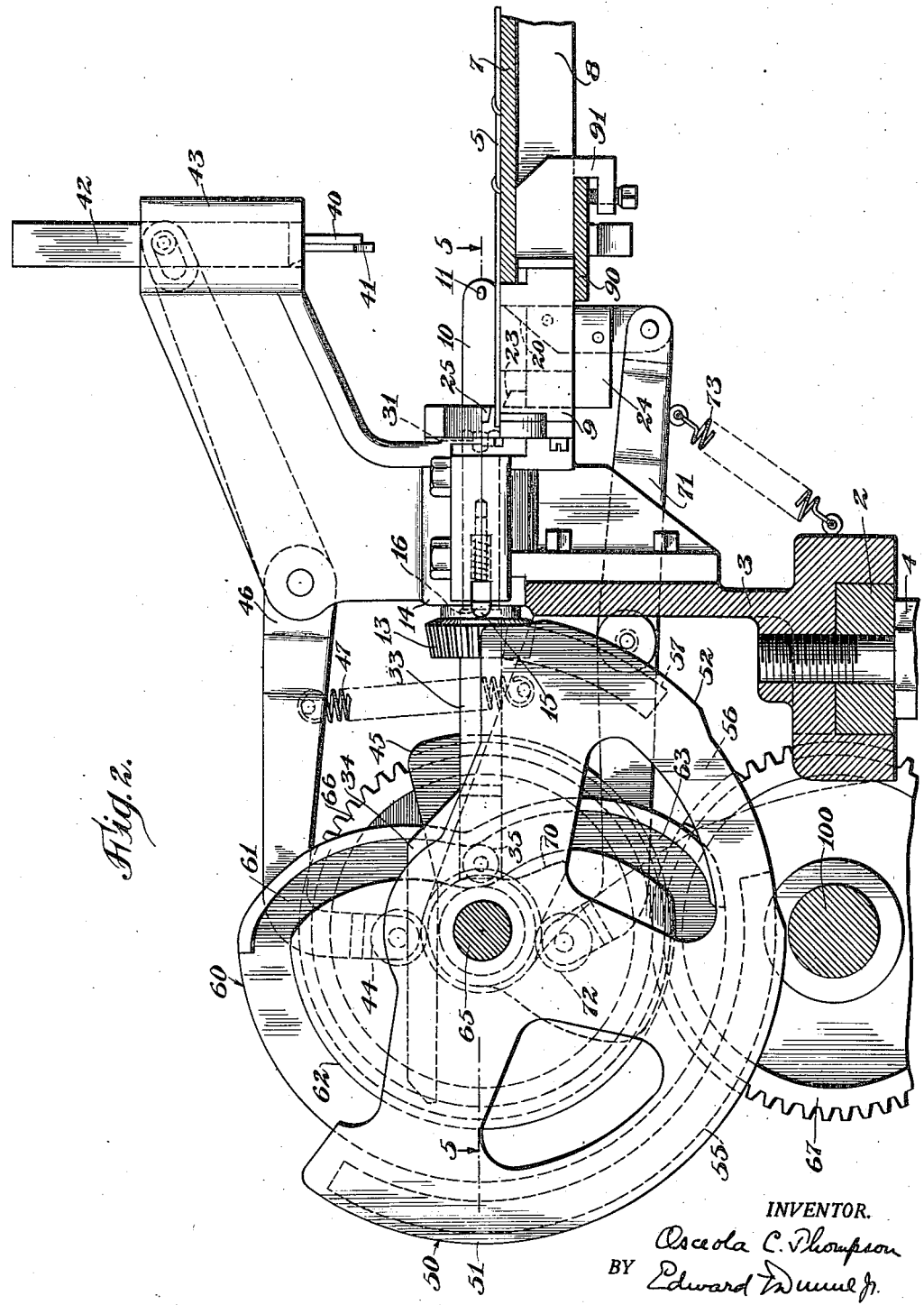

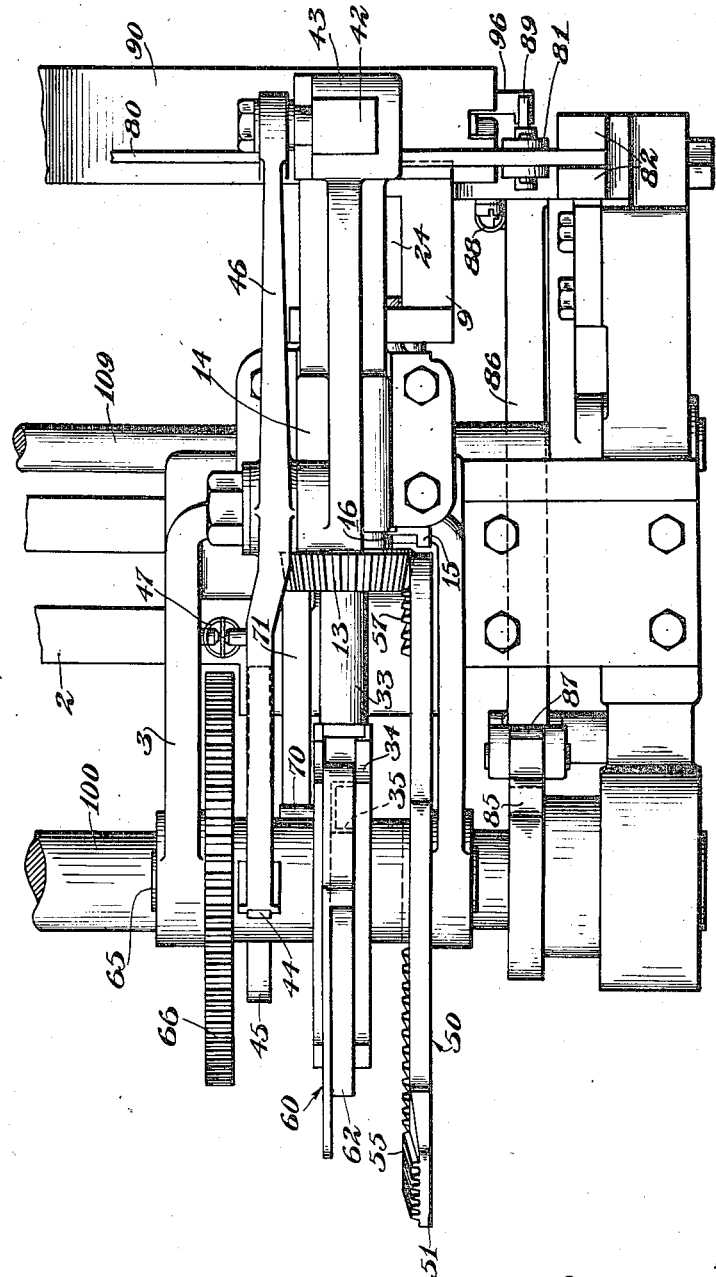

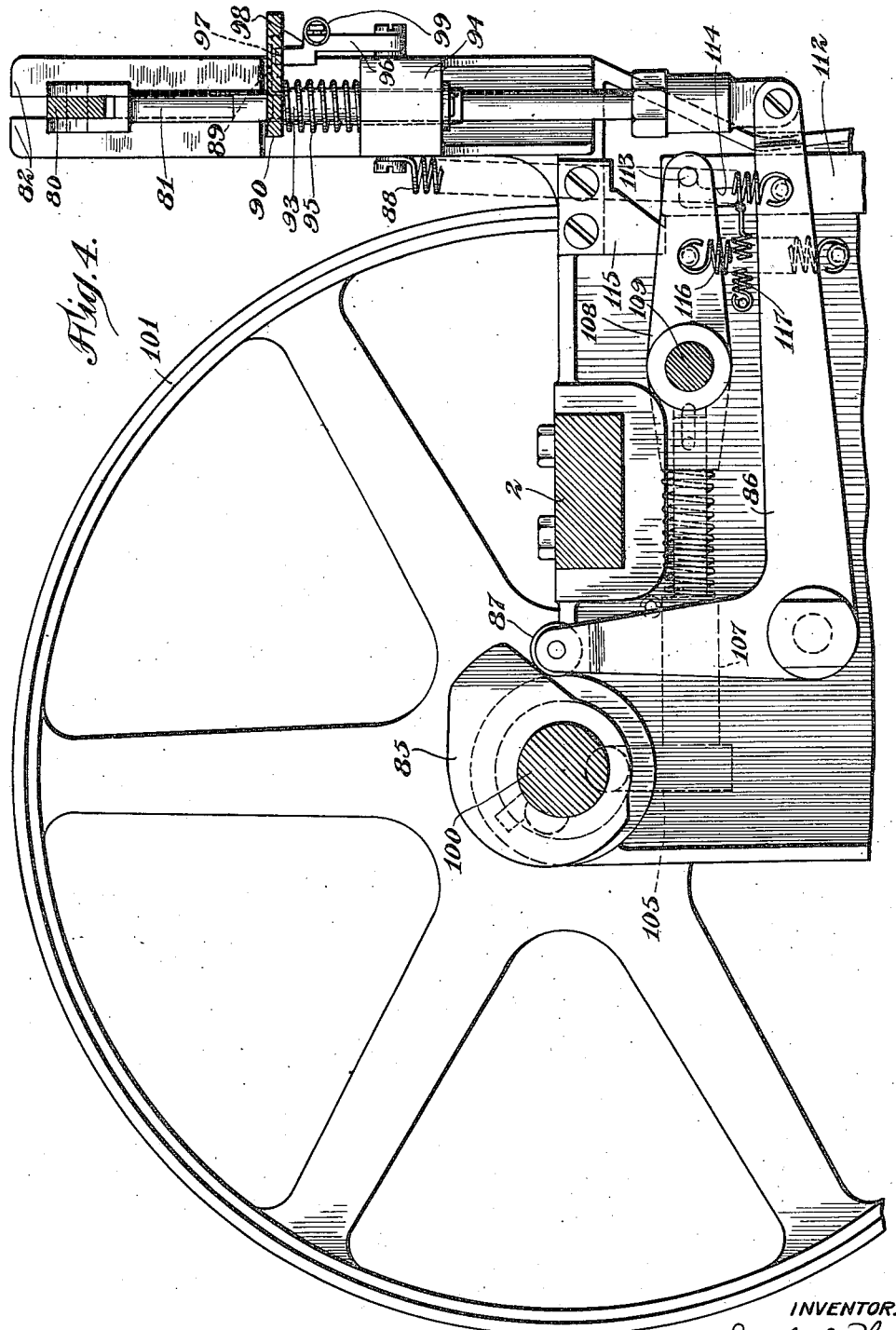

Oct. 30, 1923.
O. C. THOMPSON
1,472,534
METHOD OF MAKING BOX PARTS OR BOXES
Filed Dec. 9, 1921 6 Sheets-Sheet 5
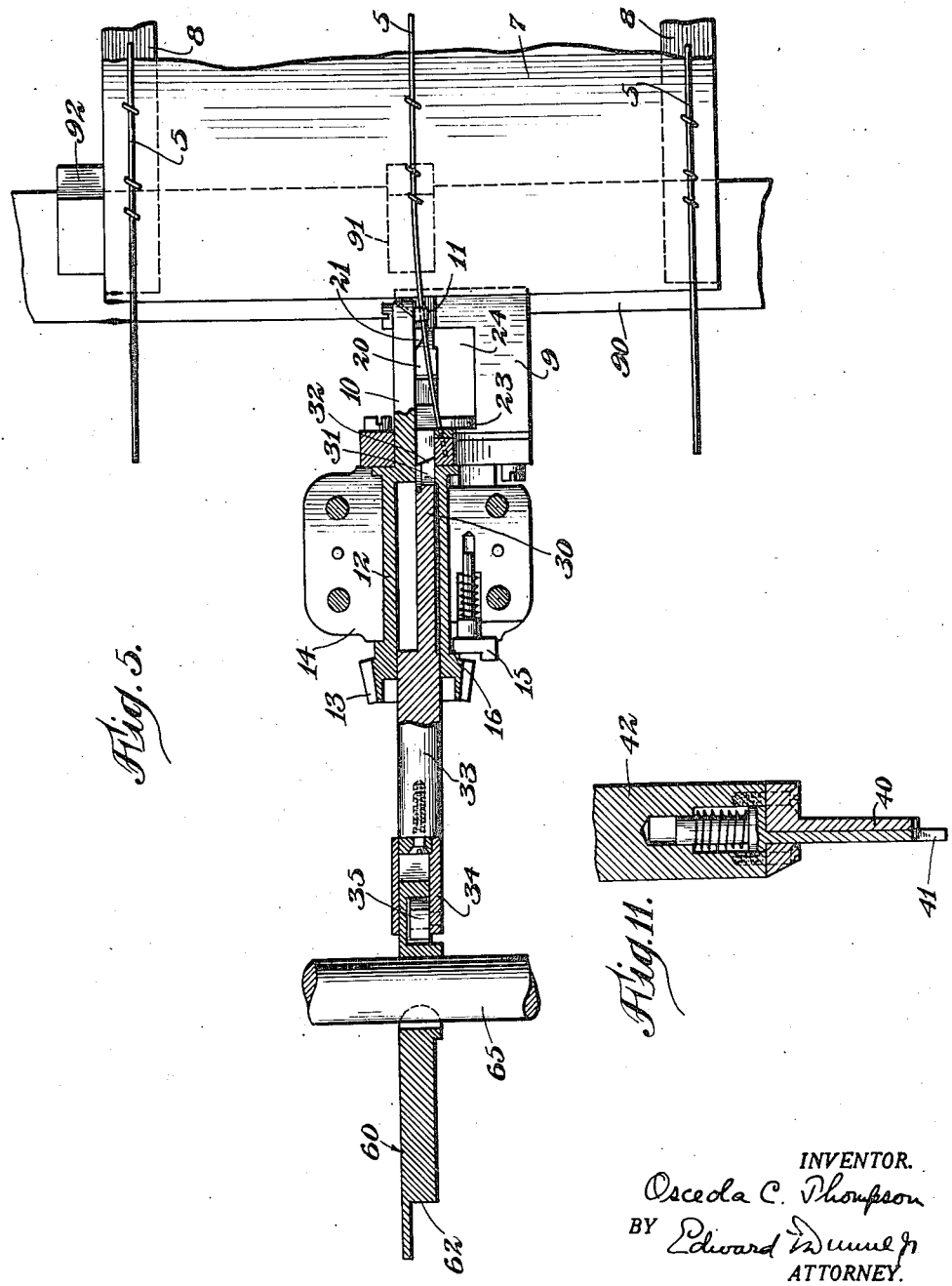
INVENTOR.
Osceola C. Thompson
BY Edward Dunne Jr.
ATTORNEY.

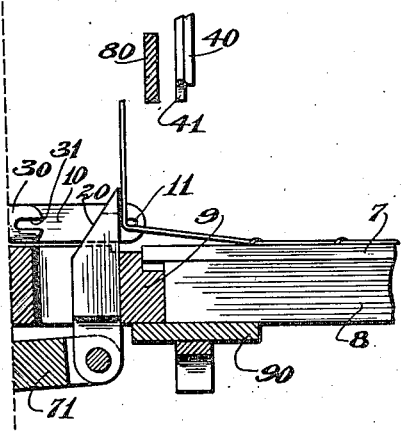
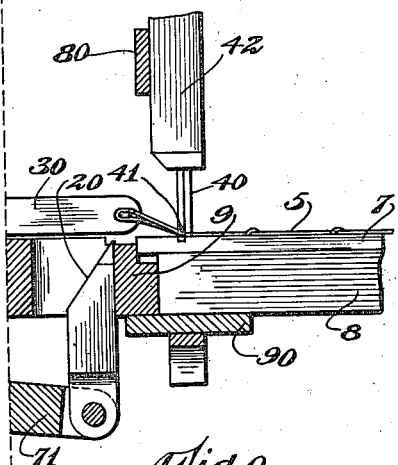
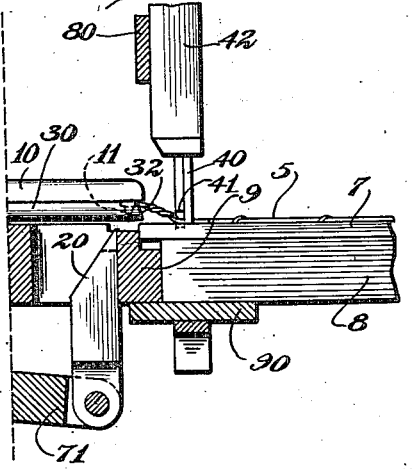
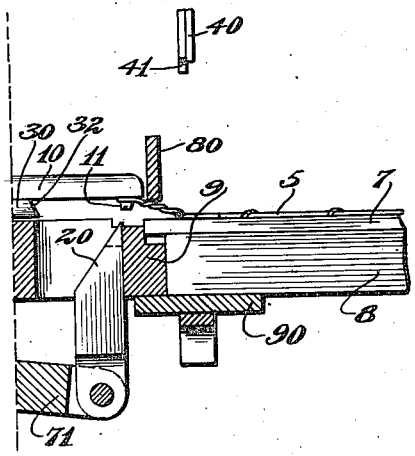
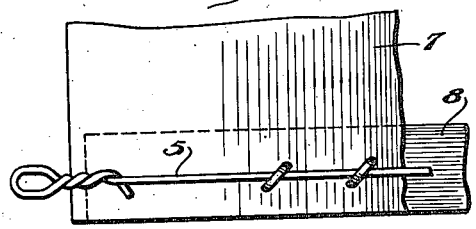

Patented Oct. 30, 1923.

1,472,534

UNITED STATES PATENT OFFICE.

OSCEOLA C. THOMPSON, OF ROCKAWAY, NEW JERSEY, ASSIGNOR TO WIREBOUNDS PATENTS COMPANY, A CORPORATION OF MAINE.

METHOD OF MAKING BOX PARTS OR BOXES.

Original application filed July 25, 1918, Serial No. 246,772. Divided and this application filed December 9, 1921. Serial No. 521,205.

*To all whom it may concern:*

Be it known that I, OSCEOLA C. THOMPSON, a citizen of the United States, and a resident of Rockaway, county of Morris and State of New Jersey, have invented Improvements in Methods of Making Box Parts or Boxes, of which the following is a specification.

This invention relates to the manufacture of wire bound boxes, box blanks and box parts and pertains more particularly to methods of supplying wires on wire bound box parts with fastening means by which such box parts may be connected one with another.

Among other objects, the invention is intended to provide methods of supplying fasteners to the wires of wire bound box parts in desired or proper relation to the box parts; to supply such fasteners in such relation to edges of a foldable box blank that when the blank is folded into box form the fasteners at either end of the blank will lie equal distances from the corner edge of the box; to supply fasteners of such form and construction that a fastener may be passed through and cooperate with a fastener identical in size and form; and generally to provide improved methods of making wire bound boxes.

The present application is a division of a copending application filed July 25, 1918, as Serial No. 246,772, which said application illustrates and defines means for carrying out the methods of manufacture claimed herein.

The character of the invention may be understood by reference to the accompanying drawings which illustrate one form of fastener and one means of supplying fasteners to box parts.

In the drawings:

Fig. 1 is a front elevation of the illustrative machine intermediate parts being broken away;

Fig. 2 is a vertical section on line 2—2 of Fig. 1 showing one of the fastener-supplying units in side elevation;

Fig. 3 is a plan view of the mechanism shown in Fig. 2;

Fig. 4 is a vertical section on line 4—4 of Fig 1;

Fig. 5 is a horizontal section on line 5—5 of Fig. 2 with a plan view of a box part presented to the machine;

Figs. 6, 7, 8 and 9 are detail views illustrating successive operations of the fastener-supplying mechanism;

Fig 10 is a plan view of a completed fastener; and

Fig. 11 is a detail section on line 11—11 of Fig. 1.

The illustrated machine comprises a number of fastener-supplying units 3 corresponding respectively to the wires of a wirebound box part which are intended to be supplied with fastening means.

These units are arranged in desired alinement and preferably operate simultaneously to supply fasteners to the wires 5 previously secured to the box part 7, the latter illustrated for example in Fig. 5 as one of the side sections of a wirebound box blank. The character of fastening means supplied by this specific mechanism is shown in Fig. 10. This fastener consists of a bight formed directly upon the binding wire itself by bending back the free end of the wire and twisting the legs of the bight, and my invention includes special features of improvement operating to supply this type of fastener.

The illustrative form of fastener-supplying unit will be first described, such units being in this instance wire bending and twisting mechanism.

Referring to Figs. 1 to 4 inclusive, each bending and twisting mechanism comprises a rotatable twisting member 10 having a lateral extension 11 which serves as a forming stud around which, while the stud remains stationary, the wire is bent, whereafter the stud is rotated upon the longitudinal axis of the twisting member so as to twist together the legs of the bight as shown in Fig. 8.

The bending is done by successively operating wipers or benders 20 and 30, one working transversely and the other associated with and moving longitudinally of the twister. The initial relationship of these elements when the wired box part is introduced to the machine is indicated in Figs. 2 and 5; showing the wire presented below the forming stud. In operation, first the wiper 20 moves upward and bends the wire on the stud approximately at a right angle, as shown in Fig. 6. In this movement, the bevelled surface 21 on the wiper crowds the wire toward the face of the twister. The wiper 20 is then immediately withdrawn. Meanwhile, the second wiper 30 is advancing, and by the time the wiper 20 is out of the way it engages and bends the wire back on itself to form the bight as shown in Fig. 7. The wiper 30 has at its end a slot 31 of differential depth to straddle the forming stud and the bend of the wire, the deeper portion of the slot being at the side of said wiper adjacent the face of the twister, and is also provided with a bevel 32 to crowd the wire against the twister during the bending operation. As said wiper 30 advances on the twister, it engages the portion of the wire previously bent around the stud 11 by the wiper 20 and bends it further around the stud until the recess or slot 31 closes over the wire, as shown in Fig. 7, thus forming and holding the bight on the twister. Following this operation the legs of the bight are clamped upon the box part by a clamping element 40, associated with which is a yielding bevelled element 41 which, during the descent of the clamping element, deflects the free end of the wire to that side of the main body of the wire corresponding to the direction of rotation of the twister. In this instance the deflection is toward the left and the rotation of the twister is contra-clockwise. The twister together with the wiper 30, which is virtually a movable part of the twister and insures the retention of the wire on the forming stud during the twist, is now rotated to give the wire any suitable number of twists as predetermined, and, the free end of the wire being at the left of its main body, and the direction of twisting being contra-clockwise, the operation causes the extremity of the wire to be positioned beneath the main body of the wire as shown in Fig. 8. The twisting operation preferably terminates with the forming stud projecting downwardly, permitting the bight to be stripped off the stud and also leaving the plane of the bight substantially parallel with the face of the box part, which is desirable in some cases to facilitate fastenings of adjacent box parts. Upon termination of the twisting operation the wiper 30 recedes and the bight is then stripped from the twister by means hereinafter referred to, whereupon, with the wiper still retracted, the twister is given a further rotation to restore the forming stud 11 to its initial position ready for a subsequent operation.

The constructional details of the twister and associated wiper 30 will be apparent from Fig. 5. The twister comprises an arm extending endwise from a journal portion 12, and the wiper 30 comprises a complemental arm extending from a part 33 which is slidable in the journal portion 12, and the rear end of which is swiveled or rotatably secured to a yoke 34 carrying a roller 35.

The several movements of the parts described above, and which are desirable when the illustrative form of fastening means is to be supplied, may be produced in any practicable manner. For example the twister is journaled in a bearing 14 and provided with a bevelled pinion 13 for actuation by a segment gear 50. The twister is normally locked against rotation by a spring-pressed detent 15 engaging a notch 16 or a similar notch not shown in the pinion 13. Cam surfaces 51 and 52 on the segment gear are adapted to displace the detent and release the twister for rotation at the proper intervals. The teeth 55 of the segment gear mesh with the pinion 13 for actuating the same for the twisting operation. The mutilation 56 of the gear then allows a dwell during the retraction of the wiper and the stripping of the bight from the forming stud. Additional teeth 57 then engage the pinion to rotate the twister sufficienly to restore to its initial or starting position shown in Fig. 2. The bending of the wire by the wipers 20 and 30 occurs during the interval before the teeth 55 move into engagement with the pinion. For actuating the wiper 30, the roller 35 is engaged by a cam groove 61 of a cam 60 to advance the wiper, then travels on a surface 62 which holds the wiper advanced during the twist, then passes into a cam groove 63 which retracts the wiper during the interval between the segment gear teeth 55 and 57 while the twister remains stationary. To hold the roller 35 at a proper elevation, to prevent jamming, the legs of the yoke 34 straddle the cam 60 and rest upon the hub of said cam.

The movement of the wiper 20, which precedes that of the wiper 30, may be effected from a cam 70 through a lever 71, provided with roller 72, the lever being actuated by the cam to elevate said wiper and retracted by a spring 73. Operable with the wiper 20 is a movable knife 23 cooperating with a fixed knife 25 to sever the end of the wire to insure the production of bights from uniform desired lengths of material. The wiper and movable knife as shown are carried by a cross head 24 movable vertically in a guide provided by a block 9 which is affixed to the bracket 3 and functions in gauging the work. The edge of the wired box part abuts against said block 9 in the presentation of the wire to the bending and twisting mechanism. While the knife is movable simultaneously with the wiper 20, it may coact with the fixed knife to sever the wire practically in advance of the effective operation of the wiper. It will be noted that the cutter mechanism is slightly to the left of the forming stud 11, so that if the wire is sufficiently long to need severing it may be presented between the knives laterally of the twister. The V-shaped space between the fixed knife 25 and the upper surface of the block 9 provides a guide for inserting the wire, and the slant of the cutting edge of the movable knife 23 tends to move the severed wire toward the twister, this movement being further promoted in the preliminary bending operation of the wiper 20 by the bevel 21 of that wiper.

The previously mentioned bight-clamping element 40, with its associated wire deflecting element 41, is carried by a head 42 movable vertically in a guide 43 on an arm projecting from the bracket 3. This device is depressed immediately following the operation of the wiper 30. As before explained, the deflector 41 pushes the extremity of the wire to the left of the main body of the wire, and the clamp 40 then clamps both wires, the element 41 yielding upwardly. The lower end of element 40 is shaped to straddle the bight. The element 41 is yieldingly held in advance of the other by a concealed spring. The device is operated by a lever 46 having a roller 44 engaged by a cam 45 to depress and hold the clamp down on the work during the twisting operation and to release it after the stripping operation. The depression may occur during the advance of the wiper 30 but is timed to bring the clamp upon the work just after the bending. To raise the clamp the lever 43 is retracted by a spring 47.

It will be understood that there may be any number of the units thus described, according to the number of wires on the box part to be supplied with fastening means. These units are represented as independent mechanisms mounted in the brackets 3 which are adjustably secured on a slotted cross-member 2 of the machine frame and secured by screw clamps 4, so that the units can be moved laterally for spacing them to correspond with the spacing of the wires of the box part. The actuating gear and cams of each unit are mounted on a shaft 65 having a gear 66 meshing with a gear 67 on a shaft 100 which extends across the machine and from which the several units are driven, the gears 67 being feathered and secured by set screws on said shaft 100 so as to be adjustable thereon with the respective units.

The stripping of the bight from the forming studs 11 after the twisting operation may be effected by a stripper bar 80 arranged across the machine in front of the bending and twisting units and adapted to descend and push down the work. This stripper bar is carried by rods 81 vertically movable in guides 82 at the ends of the machine and actuated from cams 85 on shaft 100 through levers 86 connected to said rods. The stripper bar is depressed by the engagement of the cams against rollers 87 on the levers and is elevated by retractile springs 88.

It is important that the wired box part and the wire carried thereby be accurately gauged or positioned definitely in relation to the twisting and bending or other fastener-supplying mechanism, so that the fastener, when ultimately provided, shall be positioned in desired relationship to the box part, as for example in relation to the edge of a wirebound box section. For this purpose the illustrative machine is provided with work-controlling means including the blocks 9 for abutment of the edge of the box part and a movable work-supporting table 90 and associated parts which supports the work properly positioned laterally and with the wires at the proper elevation. Adjustably secured on the table are blocks 91 for supporting the sheet material of the wirebound box blank or section 7 between its cleats, it being understood that such a blank or section usually comprises a sheet of wood veneering having end cleats, designated 8 in the drawings, and binding wires stapled through the veneering to the cleats. Where the fastener-supplying operation is upon a wire over a cleat, the cleat itself will furnish a sufficient support for the clamping of the bight on the box section by the clamping element 40, but where the operation is upon one of the intermediate wires one of the blocks 91 should be adjusted to position thereunder to afford a support corresponding to the thickness of the cleat. There is also on the work table a positioning device or guide 92, which may conveniently be a duplicate of a block 91, to engage a side of the box part, as shown in Fig. 5, and which may be adjustable along the table to accommodate different widths of box sections.

The work table is represented as guided by means of depending rods 93 vertically movable in guides 94. It is forced upwardly by springs 95 against the under-sides of the blocks 9 and is rigidly supported during the fastener-supplying operation by means of tripping elements 96 which as shown consist of pivoted angle levers having notched projections 97 which work in slots in the ends of the table and support the same in the shoulders provided by the notches of said projections. After the fastener-supplying operation, when the stripper bar descends, tappets or studs 89 on the rods 81 engage and trip the elements 96 and allow the table to be forced down by the stripper bar 80 to ledges 98 on said elements, this being a sufficient depression of the table to permit stripping of the work from the forming studs, whereupon the work can be withdrawn. Upon release of the table by the upward movement of the stripper bar, it is forced upwardly by the springs 95 and the tripping elements 96 are actuated by springs 99, connected with depending studs on the table, causing said elements to snap back into position to support the table in its elevated position. The work is thereby properly gauged by the table with its guide 92 and the blocks 9.

Referring to the box part 7, it will be noted that the edge of its sheet material projects somewhat beyond the ends of its cleats 8. The box blank is preferably made in this manner to provide overlap margins for the veneer sheets so that when folded into box form the edges of adjacent sheets may overlap one the other. Therefore the front faces of the abutment blocks 9 are correspondingly formed by rabbeting their upper parts so as to provide abutments for the ends of the cleats and for the edge of the sheet. The upper parts of the blocks 9 are also formed with depressed surfaces for the wires.

It will be noted that the axis of the twister 10 is in a somewhat higher plane than that of the box part 7, whereby clearance for the rotation of the parts is afforded and the twisted bight is formed, as is desirable, slightly above the surface of the material.

It will also be noted that the blocks 9, against which the cleat ends abut, gauge the position of the fastener-supplying operation from the cleat ends. This is particularly advantageous in that the fasteners formed at both ends of a box blank will lie equal distances from the corner edge of the box when the blank is folded into box form.

The operation may be briefly summarized as follows: It will be understood that the work is positioned by placing it upon the table 90 against the abutment blocks 9, and moving it laterally against the guide 92, the ends of the wires 5 being presented and guided laterally between the knives 23 and 25, and the wires coming under the forming studs 11 of the respective twisters.

The work being thus positioned, and the machine being set in motion, the movable knife 23 and the wiper 20 are first actuated and retracted, cutting and bending up the wire; and the advancing wiper 30 then bends back and closes over the wire on the stud 11 to form the bight. Meanwhile the twister and forming stud 11 remain stationary, the twister pinion being locked by the latch 15. As the said wiper 30 completes its forward movement, the deflecting element 41 descending with the clamp 40 engages and pushes the wire to the left of the main body of the wire and then yields upwardly as the clamp 40 further descends and clamps the bight. The twister being now released by the latch 15 is rotated to twist the bight, terminating its operation with the forming stud 11 projecting down, whereupon the twister is again locked and the wiper 30 retracted. By this time the descending stripper bar 80 engages the work and strips the bight from the forming stud, the work table supports 96 having been tripped to allow the descent of the table with the work. The clamp 40 is immediately raised, and the twister is again unlatched and rotated slightly to restore it to its initial position ready for operation upon a second wired box section.

The machine is preferably designed for a single cycle of operation, automatically stopping with the mechanism in the position shown in Fig. 2. For this purpose, any approved automatic throw out clutch may be employed for clutching the power pulley 101 to the shaft 100, said clutch being controlled by any convenient means, as a pedal or foot lever adapted to be depressed by the operator, after the work is inserted, to cause clutching of the power with the machine. The clutch will automatically release, and by suitable braking or rebound-preventing devices, associated therewith, insures the stopping of the parts in the proper initial relation. The character of such clutches is well known and need not be more specifically referred to.

In the illustrated machine the clutch is thrown out by striking of a clutch dog 105 against a buffer stop 107 carried by a rocker shaft 109, and is thrown in upon release of said dog by displacement of the stop 107, the shaft 109 being rocked to displace the stop by a foot lever (not shown) and being automatically reversed to restore the stop so as to insure the throw out of the clutch at the proper time, even though the operator should continue to keep the foot lever depressed. This is accomplished by illustrated devices in connection with the lift rod 112 which conveys motion from the foot lever to the rocker shaft 109. An arm 108 extending from said rocker shaft carries a stud 113 engaged in an L-shaped slot 114 in the upper end of the lift rod 112, whereby the upward movement of the latter rocks the shaft to displace the buffer stop 107. In the upward movement of the lift rod 112, it is forced by a cam 115 into position to allow the stud 113 to enter the opposite end of the L-shaped slot 114, and the arm 108 is retracted by a spring 116 to restore the stop 117 to position. A spring 117 tends to hold the lift rod 112 in position to engage the stud 113 as shown.

It will be noted that the form of fastener illustrated in Fig. 10 has an opening which is longer than the width of the fastener whereby one fastener may be passed through another identical in size and form.

Having now described my invention, I claim:

1. A method of making wirebound boxes which is characterized by assembling a box blank having cleats and sheets connected together by binding wire secured thereto, with the sheet at one end of the blank extending beyond the cleat end a distance approximately equal to the thickness of the sheet; by severing the ends of the wire uniform distances from the cleat ends; and by supplying the wire ends with interengageable fastening means at equal distances from their adjacent cleat ends whereby when the blank is folded into box form the fasteners will extend equal distances from the corner edge of the box.

2. The process of providing a wirebound box blank having cleats and sheets with fastening means whereby the ends of each wire may be detachably joined when the blank is folded into box form, which consists in supplying each end of a wire with fastening means an equal distance from its adjacent cleat end whereby, when the blank is folded into box form, the fastening means at the ends of the wire will lie equal distances from the corner edge of the box.

3. The process of providing wirebound boxes with fastening means which is characterized by forming a bight on the end of a wire secured to a box part; said bight having an opening longer than the outside width of the bight, whereby identical bights may be passed one through the other.

4. The process of providing wirebound box blanks with fastening means which is characterized by forming a bight on either end of a wire secured to a box blank, having an opening longer than the outside width of the bight, whereby identical bights on either end of the wire may be passed one through the other when the blank is folded into box form.

5. The process of providing wired box parts with fastening means whereby one box part may be connected with another box part, which is characterized by forming a bight on the end of the wire secured to a box part, having an opening longer than the outside width of the bight whereby an identical bight on the wire of another box part may be passed therethrough.

6. A method of making wirebound boxes which is characterized by assembling a box blank having cleats and sheets connected together by binding wire, with the sheet at one end of the blank extending beyond the cleat end a distance approximately equal to the thickness of the sheet and with the sheet at the other end of the blank flush with the end of the cleat; and by supplying the wire ends with interengageable fastening means extending equal distances beyond their adjacent cleat ends whereby when the blank is folded into box form the fasteners will extend equal distances from the corner edge of the box.

In testimony whereof, I have signed my name to this specification.

OSCEOLA C. THOMPSON.